E. HENRY.
DEMOUNTABLE RIM.
APPLICATION FILED JUNE 2, 1916.
1,224,637.
Patented May 1, 1917.
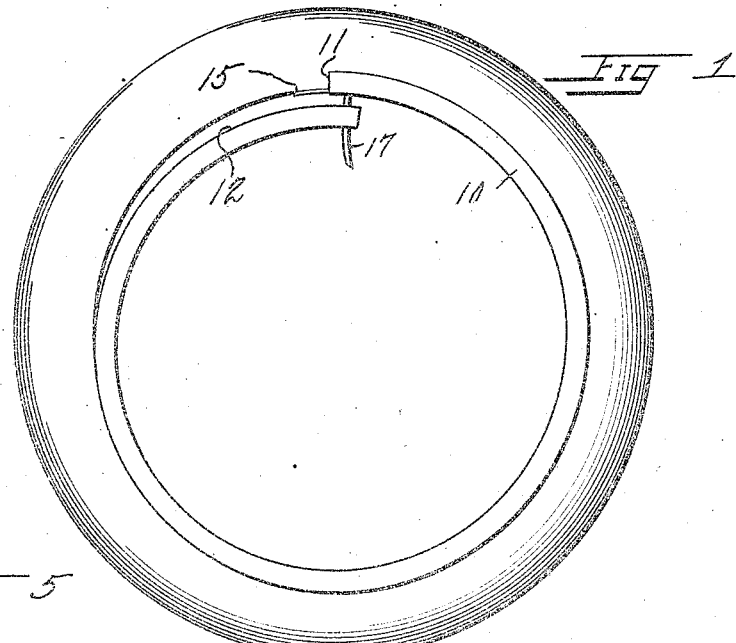
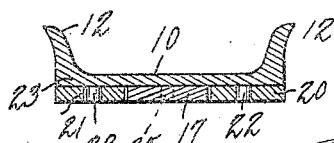
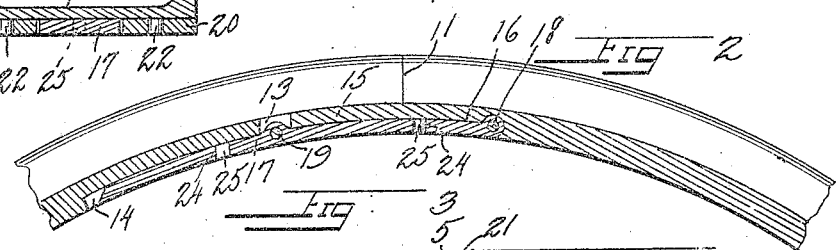
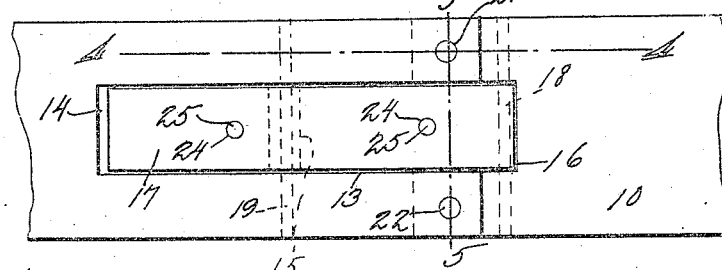
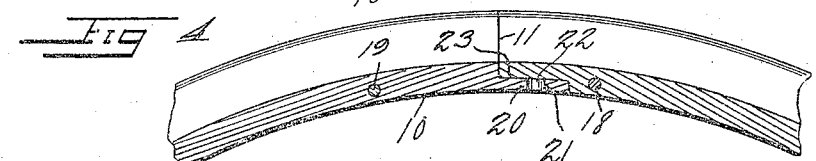
Inventor
E. Henry

UNITED STATES PATENT OFFICE.

EARL HENRY, OF ALBERT LEA, MINNESOTA.

DEMOUNTABLE RIM.

1,224,637.

Specification of Letters Patent.   Patented May 1, 1917.

Application filed June 2, 1916.   Serial No. 101,344.

*To all whom it may concern:*

Be it known that I, EARL HENRY, a citizen of the United States, residing at Albert Lea, in the county of Freeborn, State of Minnesota, have invented certain new and useful Improvements in Demountable Rims; and I do hereby declare the following to be a full, clear, and exact description of the invention, such as will enable others skilled in the art to which it appertains to make and use the same.

This invention relates to improvements in vehicle wheels and is directed more particularly to a demountable rim for pneumatic tires of such structure as to facilitate a quick mounting or demounting of a tire.

An object of the present invention resides in the provision of a demountable rim of the contractile type in which means of novel construction and arrangement are provided for applying or removing same from a tire.

A further object of the invention is to provide a demountable rim which may be quickly and conveniently contracted and expanded, novel means being provided for locking the same in expanded position.

With the above and other objects of similar nature in view, the invention consists in the construction, combination and arrangement of parts, set forth in and falling within the scope of the appended claims.

In the drawings:

Figure 1 is a side elevation of a pneumatic tire with the invention associated therewith and in collapsed position.

Fig. 2 is a fragmentary section taken longitudinally through the rim,

Fig. 3 is a fragmentary plan view of the inner face of the rim,

Fig. 4 is a longitudinal section taken on the line 4—4 of Fig. 3, and

Fig. 5 is a transverse section taken on the line 5—5 of Fig. 3.

Referring now more particularly to the accompanying drawing, the rim is designated generally at 10 and comprises a ring, constructed preferably of spring metal, split transversely as indicated at 11 and provided with the usual tire retaining beads 12.

One of the split portions of the ring is terminally provided with a longitudinally extending slot 13 while the material inwardly of said slot has its inner face reduced in thickness to produce a counter-sink 14 approximately the width of and forming a continuation of the slot. The terminal of the other split portion of the rim has formed integrally therewith a longitudinal extension 15 and is likewise provided in its inner face with a counter-sink 16 corresponding to and alining with the counter-sink 14 of the first split portion. The extension 15 is adapted when the rim is in extended or set-up position to seat within the slot 13 of the first split portion and lie flush with the outer surface thereof, relative lateral play of the portions being in this wise prevented.

For operating the rim to expand or contract the same, there is provided a lever 17, hinged at one end to the second split portion as indicated at 18 and normally seated in the alined counter-sinks 14 and 16 to lie flush with the inner face of the ring, it being of course understood that said lever is of arc-shaped formation so as to conform to the curvature of the ring. Engaged transversely through the rim and slot adjacent the closed end of the latter is a pin 19 on which is intermediately pivoted the lever 17. Thus by grasping the free end of the lever and swinging the same inwardly on the hinge 18, the first split portion of the ring will be sprung inwardly and the ring thus contracted to permit of its disengagement from the tire, the extension 15 moving out of the slot 13 as is obvious.

In order to further assist in locking the split portions of the ring in longitudinal alinement and relieve any strain which might be brought upon the points of attachment of the lever with the ring, the free end of the first split portion at each side of the slot 13 is reduced in thickness for a portion of its length as indicated at 20 and provided with apertures 21 for engagement with corresponding lugs 22 carried by the second split portion; said latter portion being also reduced in thickness as indicated at 23 to accommodate the reduced portion 20.

The lever 17 is also provided at each side of the pin 19 with apertures 24 engageable with lugs 25 on the split portions whereby to provide an additional safe-guard against relative lateral or longitudinal movement of the split portions.

What is claimed is:—

1. A demountable rim comprising a split ring slotted from one end and provided at its other end with an extension engageable in the slot, and a lever hinged at one end adjacent the extension and pivoted in the slot to expand or contract the ring.

2. A demountable rim comprising a resilient ring split transversely one end of the split having a slot therein, a lever hinged to the other end of the split and pivoted in the slot with its free end extending inwardly of the ring, and lugs carried by the second split, and engageable in openings in the first split and said lever being operable to move said split ends out of alinement to disengage said lugs from the openings and contract the ring.

In testimony whereof I affix my signature in the presence of two witnesses.

EARL HENRY.

Witnesses:
J. JEUNE CARTER HAUGDAHL,
H. H. DUNN.